(12) United States Patent
Imaeda et al.

(10) Patent No.: US 7,052,002 B2
(45) Date of Patent: May 30, 2006

(54) VIBRATION-DAMPING DEVICE

(75) Inventors: Kenichiro Imaeda, Komaki (JP); Hiroaki Hori, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 11/047,614

(22) Filed: Feb. 2, 2005

(65) Prior Publication Data

US 2005/0179179 A1    Aug. 18, 2005

(30) Foreign Application Priority Data

Feb. 12, 2004    (JP)    ............... 2004-034768

(51) Int. Cl.
*F16F 5/00*    (2006.01)

(52) U.S. Cl. .................. 267/140.12; 267/293

(58) Field of Classification Search ............... 267/257, 267/292, 293, 140.11, 140.5
See application file for complete search history.

(56) References Cited

U.S. PATENT DOCUMENTS

| | | | | |
|---|---|---|---|---|
| 4,958,811 A | * | 9/1990 | Brenner et al. | ........ 267/140.12 |
| 5,865,429 A | * | 2/1999 | Gautheron | ............... 267/141.7 |
| 6,145,821 A | * | 11/2000 | Suzuki et al. | .......... 267/140.12 |
| 6,378,853 B1 | * | 4/2002 | Kammel et al. | ......... 267/141.2 |
| 6,659,435 B1 | * | 12/2003 | Yamaguchi et al. | ... 267/140.12 |

FOREIGN PATENT DOCUMENTS

| | | | |
|---|---|---|---|
| JP | A 06-179315 | | 6/1994 |
| JP | 10-238574 | * | 9/1998 |
| JP | 10-252795 | * | 9/1998 |
| JP | B2 3507937 | | 1/2004 |
| JP | B2 3520176 | | 2/2004 |

* cited by examiner

*Primary Examiner*—Devon Kramer
(74) *Attorney, Agent, or Firm*—Oliff & Berridge, PLC

(57) ABSTRACT

A vibration damping device includes an inner cylinder member having a first outer flange extending diametrically outward from its one axial end; an outer cylinder member having a second outer flange extending diametrically outward at its one axial end; and a rubber elastic body elastically connecting the inner cylinder member and the outer cylinder member, while having an end section sandwiched between sandwiched between the first and second outer flanges. The rubber elastic body is provided with hollow portions recessed diametrically inward from an outside periphery of the first outer flange at three or four locations in a circumferential direction of the end section of the rubber elastic body.

3 Claims, 4 Drawing Sheets

PRIOR ART

VIBRATION-DAMPING DEVICE

INCORPORATED BY REFERENCE

The disclosure of Japanese Patent Application No. 2004-034768 filed on Feb. 12, 2004 including the specification, drawings and abstract is incorporated herein by reference in its entirety.

BACKGROUND OF THE INVENTION

1. Field of the Invention

The present invention relates to a vibration-damping device for use as an automotive suspension bushing, member mount, body mounting, or the like.

2. Description of the Related Art

As conventional vibration damping device of this kind, there are known suspension bushings such as the one illustrated in FIG. 5 for example, which comprises a metallic outer cylinder member 1 having an outer flange portion 2 at one axial end thereof, a metallic inner cylinder member 3 disposed coaxially within the outer cylinder member 1, with one axial end projecting out from one end of the outer cylinder member 1, a rubber elastic body 4 providing elastic connection between the inner and outer cylinder members 1, 3, and a stopper rubber 5 disposed axially outside the outer flange portion 2. This suspension bushing is mounted onto a component on the vehicle body side, by superposing a washer 6 of annular disk shape onto one end of the inner cylinder member 3 and passing a bolt (not shown) through the bore of the inner cylinder member 3 to thereby attach the outer cylinder member 1 to a suspension arm. By means of this design, clearance is provided between the washer 6 and the stopper rubber 5 so as to avoid excessive deformation of the suspension bushing in the axial direction in response to excessive vibrational input in the axial direction, ensuring stable drivability of the vehicle. However, due to a certain level of variability when installing suspension bushings on vehicles, there tends to be variability in the amount of clearance, creating the problem of difficulty in ensuring stable drivability of a vehicle consistent with settings made on the basis of the design.

This drawback may be solved by the rubber bushing disclosed in JP-A-6-179315, which is shown schematically in FIG. 6. This conventional rubber bushing comprises an inner cylinder member 7 having an outer flange 8 that extends diametrically outward at one axial end, and an outer cylinder member 1 having an outer flange 2 that extends diametrically outward at one axial end. The outer cylinder member 1 is coaxially disposed about the inner cylinder member 7 such that the one axial end of the inner cylinder member 7 projects outwardly from the one end of the outer cylinder member 1 and the outer flanges 2, 8 are situated in opposition in the axial direction, while the inner and outer cylinder members 1, 7 including the outer flanges 2, 8 being elastically connected by a rubber elastic body 9 disposed therebetween.

According to this rubber bushing, the rubber elastic body 9 is interposed between the two outer flanges 2, 8, whereby variability in dimension between the two is avoided, and since the axial length of the rubber elastic body in this area is uniform, stable drivability of the vehicle is ensured. However, the rubber elastic body 9 disposed between the two outer flanges 2, 8 has rigid spring characteristics in the axial direction, and in the case where the thickness of the rubber elastic body 9 between the two outer flanges 2, 8 is less than the thickness of the rubber elastic body 9 disposed between the inner and outer cylinder members 7, 1 in the diametrical direction, the torsion spring characteristics of the rubber elastic body 9 between the two outer flanges 2, 8 may be rigid as well. Thus, the problems of poor vehicle ride comfort, as well as poor durability of the rubber elastic body in the axial direction and the torsion direction may be poor.

SUMMARY OF THE INVENTION

It is an object of the present invention to provide a vibration damping device that is able to provide stable vehicle drivability consistent with settings made on the basis of the design, and to exhibit softer spring characteristics in the axial direction and the torsion direction of the rubber elastic body disposed between the two outer flanges in order to give the vehicle a comfortable ride, while to improve durability of the rubber elastic body.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention is a vibration damping device comprising: (a) an inner cylinder member having a first outer flange that extends diametrically outward at one axial end thereof; (b) an outer cylinder member having a second outer flange that extends diametrically outward at one axial end thereof, the outer cylinder member being coaxially disposed about the inner cylinder member projecting out from the one axial end of the outer cylinder member and the first and second outer flanges situated spaced apart in opposition to one another in the axial direction; and (c) a rubber elastic body interposed between and elastically connecting the inner cylinder member and the outer cylinder member, while having an end section sandwiched between the first and second outer flanges, wherein the rubber elastic body is provided with hollow portions recessed diametrically inward from an outside periphery of the first outer flange at three or four locations in a circumferential direction of the end section of the rubber elastic body.

In the invention having the arrangement described above, there is maintained the uniform axial length of the end section of the rubber elastic body sandwiched between the first and second outer flanges of the inner cylinder member and the outer cylinder member, whereby vehicle drivability consistent with settings made on the basis of the design can be assured, without being influenced by deterioration in installation condition of the vibration damping device on the vehicle. By providing hollow portions recessed diametrically inward from the outside periphery of the first outer flange of the inner cylinder member at three or four locations in the circumferential direction of the end section of the rubber elastic body, the rubber elastic body section is imparted with softer characteristics in the axial direction as well as softer spring characteristics in the torsion direction, so that vehicle ride comfort is improved. Additionally, by imparting softer spring characteristics to the rubber elastic body sandwiched between the first and second outer flanges, durability of the rubber elastic body per se is improved.

Preferably, the hollow portions may be disposed at equidistant intervals in the circumferential direction. By disposing the hollow portions at equidistant intervals in the circumferential direction in this way, directionality in the locations of the hollow portions in the rubber elastic body is eliminated, thereby improving workability of the molding process. Also, during installation of the vibration damping device onto a vehicle, workability of the assembly process is improved by the greater ease of installation of the vibration damping device. Further, the rubber elastic body exhibits uniform spring characteristics in response to vibration input at any location in the circumferential direction. With this regards, since the hollow portions are provided at three or four locations in a circumferential direction, the rubber elastic body is able to eliminate directionality, while improving workability of the vibration damping device molding process, efficiently. Namely, the use of only two hollow recesses makes it impossible to achieve non-directionality of the vibration damping device, and the use of five or more hollow recess creates a problem of undercut in a mold, leading to cumbersome manufacturing process of the vibration damping device.

According to the present invention, irrespective of any variability in the vibration damping device assembly process, stable vehicle drivability consistent with settings can be assured. Also, with the help of improved softer spring characteristics in the axial direction and torsion direction of the end section of the rubber elastic body sandwiched between the first and second outer flanges of the inner and outer cylinder members, good ride comfort can be provided and durability of the rubber elastic body per se can be improved. Additionally, by situating the hollow portions at equidistant intervals in the circumferential direction to eliminate directionality, workability of the vibration damping device molding process improved, workability of the vibration damping device assembly process is improved, and the rubber elastic body exhibits uniform spring characteristics in response to vibration input at any location in the circumferential direction.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
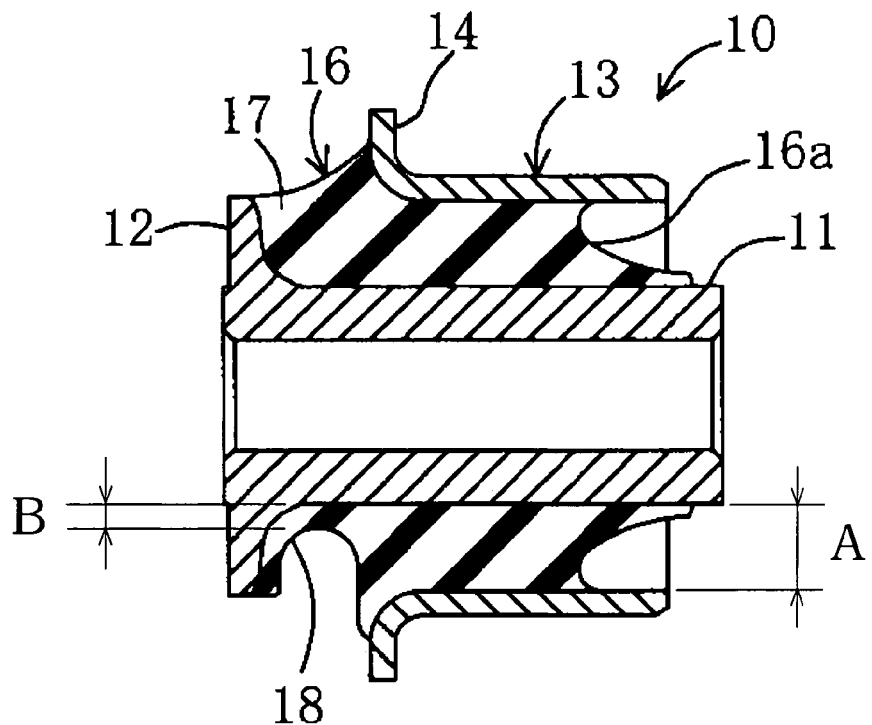
FIG. 1 is an axial cross sectional view of a suspension bushing of construction according to a first embodiment of the present invention, taken along line 1—1 of FIG. 2.
Figure 2:
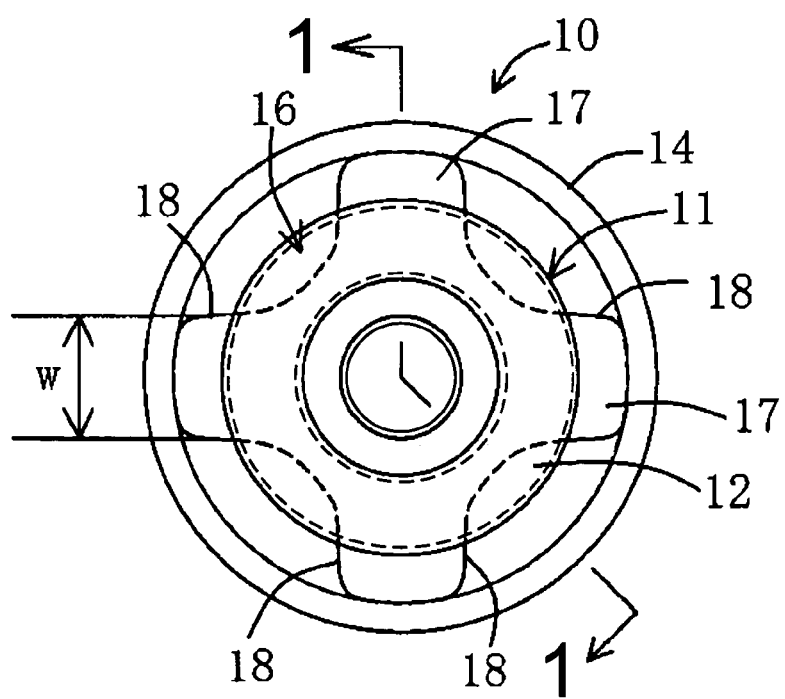
FIG 2. is a first left side elevational view of the suspension bushing of FIG. 1.
Figure 3:
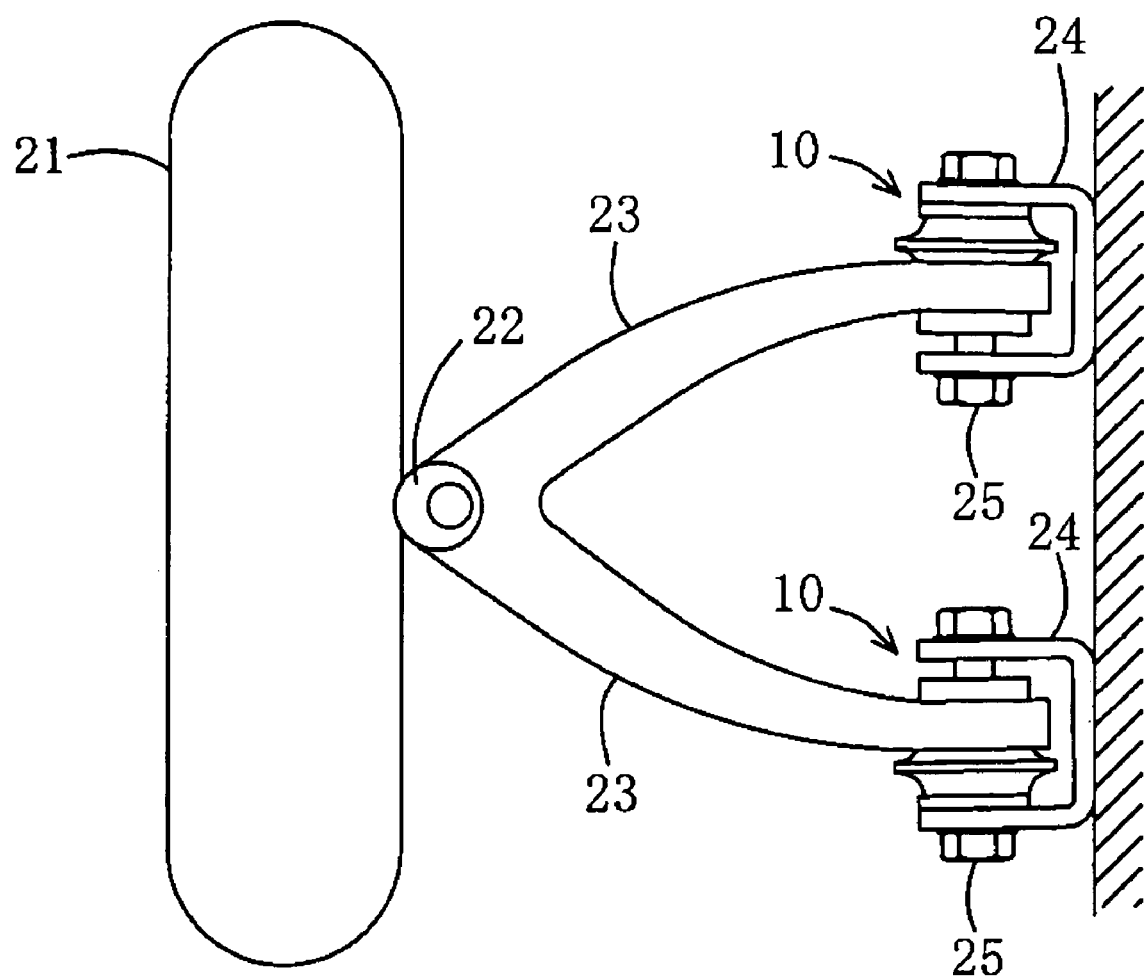
FIG. 3 is a schematic illustration showing suspension bushings of FIG. 1 installed on a vehicle.

There will be described currently preferred embodiments of the invention with reference to the accompanying drawings. FIG. 1 and FIG. 2 show in cross sectional view and left side view respectively, a suspension bushing 10 (hereinafter referred to as bushing) of construction according to a first embodiment of the invention that is a vibration damping device installed between an upper control arm of a vehicle suspension and a component on a vehicle body side. FIG. 3 is a perspective view showing the bushing installed on the vehicle.

The bushing 10 comprises an inner cylinder member 11 with an outer flange (first outer flange) 12 extending diametrically outward from one axial end, namely the left end; and an outer cylinder member 13 disposed coaxially to the outside thereof, with an outer flange (second outer flange) 14 extending diametrically outward from one axial end, the axial left end of the inner cylinder member 11 projecting axially outward from the axial left end of the outer cylinder member 13 and the outer flanges 12, 14 situated spaced apart in opposition to one another in the axial direction, and with the two members being elastically connected by a rubber elastic body 16 disposed between the inner and the outer cylinder members 11, 13 including the two outer flanges 12, 14. Hollow portions recessed diametrically inward from the outside periphery of the outer flange 12 of the inner cylinder member 11 are disposed at three or four location sin the circumferential direction of an end section 17 of the rubber elastic body 16, which section 17 sandwiched between the two outer flanges 12, 14. In the description hereinbelow, vertical and left/right relationships of the various parts of the bushing 10 coincide with the vertical and left/right directions in FIG. 1, as a general rule.

The inner cylinder member 11 is a member of thick-walled cylindrical shape, having integrally disposed at the axial left end thereof the annular outer flange 12 projecting diametrically outward. The axial inside face of the outer flange 12 is of generally conical shape sloping slightly in the diametrical direction, with the boundary with a cylindrical side having a curving shape. The outer flange 12 is integrally formed by means of forging a thick metal pipe, for example. The outside diameter of the outer flange 12 is approximately the same as the inside diameter of the outer cylinder member 13. The outer cylinder member 13 is a member of thin-walled cylindrical shape, having integrally disposed at the axial left end thereof the annular outer flange 14 projecting diametrically outward. The outer flange 14 is formed on the outer cylinder member 13 by means of subjecting one end of a thin metal pipe to a caulking process, for example. The basal portion of the outer flange 14 is rounded into a curving shape. The axial length of the outer cylinder member 13 is shorter than the axial length of the inner cylinder member 11, and is positioned between the two axial ends of the inner cylinder member 11, with the outer flange 14 spaced apart from the outer flange 12 of the inner cylinder member 11 by a specified distance.

The rubber elastic body 16 is formed by means of being vulcanization-molded between the inner cylinder member 11 including the outer flange 12, and the outer cylinder member 13 including the outer flange 14, and elastically connects the inner and outer cylinder members 11, 13. At the right end of the rubber elastic body 16 is disposed a right hollow portion 16a recessed in the axial direction from the right end around the entire circumference of the rubber elastic body 16. By means of this right hollow portion 16a, the rubber elastic body 16 is imparted with soft spring characteristics on the outer cylinder member 13 side. At the end section 17 of the rubber elastic body, which is the portion of the rubber elastic body 16 situated between both outer flanges 12, 14, there are disposed four hollow portions 18 spaced apart at equidistant intervals of 90° in the circumferential direction, giving the elastic body end portion 17 a generally cross shape. The hollow portions 18 are produced by arcuate notching of the rubber elastic body 16 situated between both outer flanges 12, 14, at four locations thereon with center angles of approximately 90°, and are recessed diametrically inward from the outer periphery of the outer flange 12 to a location in proximity of the tube portion. The end section 17 of the rubber elastic body, at the outer circumferential rim thereof, measures a circumferential width w of 5 mm or more. If the circumferential width of the outer circumferential rim of the end section 17 of the rubber elastic body is less than 5 mm, strength will be diminished, desired spring characteristics in the axial direction and torsion direction will not be achieved, and durability will not be obtained.

As will be apparent from FIG. 2, each hollow portion 18 has an arcuate concave shape overall in transverse cross section wherein an inwardly curved bottom surface located most radially inner position thereof extends towards both circumferential ends thereof while gradually extending radially outwardly. Since each hollow portion 18 has a smoothly curved surface with no junction, the bushing 10 is free from or less suffer from the problem of stress concentration in the junction point when undergoing stress in the torsion direction. Further, since the presence of the hollow portions 18 can reduce the volume of the rubber elastic body 16 at a most outer circumferential portion of the end section 17 where is most likely subjected to elastic deformation thereof, the likelihood of stress concentration at the most outer circumferential portion of the end section 17, and a resultant defect such as a crack of the 4rubber elastic body 16 can be effectively prevented. This arrangement makes it possible to import softer spring characteristics to the end section 17 of the rubber elastic body 16, wherein durability of the elastic body end section 17 per se is improved.

Further, as shown in FIG. 1, each hollow portion 18 has a largest diametrical depth dimension B that is smaller than a half of a diametrical interval A between cylindrical portions of the inner and outer cylinder members 11, 13 mutually opposed in the diametric direction (B<A/2). With this arrangement, the bushing 10 is effectively endowed with softer spring characteristics in the torsion direction. Namely, if the largest diametrical depth dimension B of each hollow portion 18 is not smaller than the half of the diametrical interval A between the inner and outer cylinder members 11, 13, the volume of the rubber elastic body at the outer circumferential portion of the end section 17 is inevitably increased, leading to hard spring characteristics in the torsion direction.

As shown in FIG. 3, the bushing 10 fabricated in the above manner is installed onto the vehicle, by being secured by means of press-fitting the outer cylinder member 13 onto a pair of arm portion of an upper control arm 23 which is mounted on a tire 21 by means of a ball joint 22, while aligning the bore of the inner cylinder member 11 with a mounting hole in the subframe 24 on the vehicle body side, and securing it to the subframe by passing a bolt 25 through the bore and the mounting hole and threading a nut 26 thereon.

In the embodiment having the arrangement described above, since there is maintained uniform axial length on the end section 17 of the rubber elastic body 16 situated between both outer flanges 12, 14 of the inner and outer cylinder members 11, 13, irrespective of variability in the process of installing the bushing 10 on a vehicle, stable vehicle drivability consistent with the design settings can be assured. Additionally, by disposing hollow portions 18 recessed diametrically inward from the outer periphery of the outer flange 12 of the inner cylinder member 11, situated at equidistant intervals in the circumferential direction of the end section 17 of the rubber elastic body 16, the axial characteristics of the end section 17 of the rubber elastic body 16 are made softer and spring characteristics in the torsion direction are made softer, resulting in improved ride comfort of the vehicle. Additionally, by imparting softer spring characteristics to the end section 17 of the rubber elastic body 16, durability of the elastic body end section 17 per se is improved.

In the present bushing 10, by disposing the hollow portions 18 at equidistant intervals at four locations in the circumferential direction, directionality of locations of the hollow portions 18 in the elastic body end portion 17 is eliminated. Thus, when molding the rubber elastic body 16, mold parting can be carried out easily, improving workability of the molding process. The procedure of installing the bushing 10 on a vehicle is also facilitated, improving workability of the installation process. Further, the rubber elastic body 16 will exhibit uniform spring characteristics in response to vibration input at any location in the circumferential direction, without being affected by the circumferential locations of the hollow portions 18.

Figure 4A:
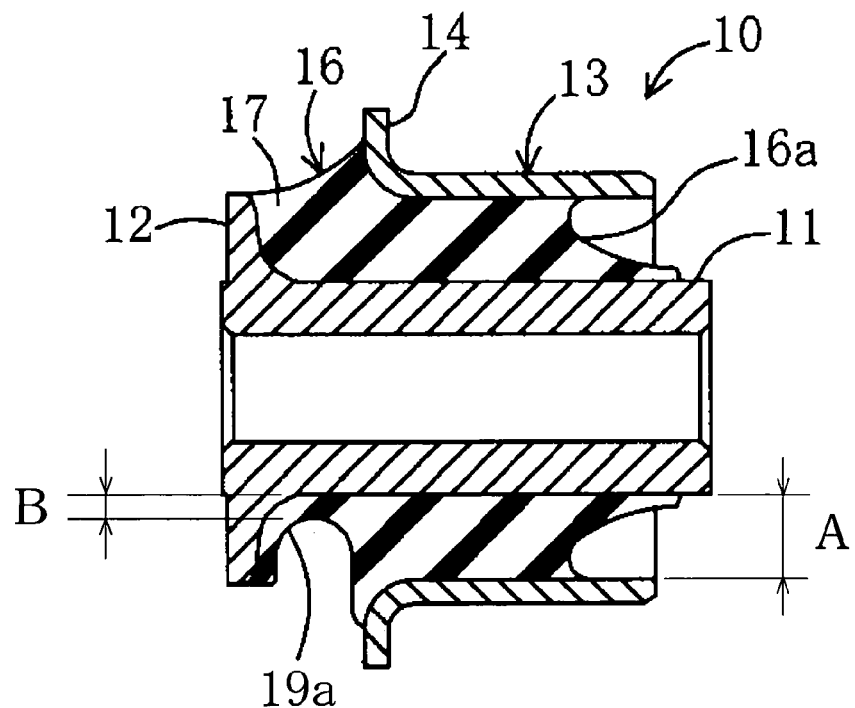
FIG. 4A is an axial cross sectional view of a suspension bushing of construction according to a second embodiment of the present invention, taken along line A—A of FIG. 4B
Figure 4B:
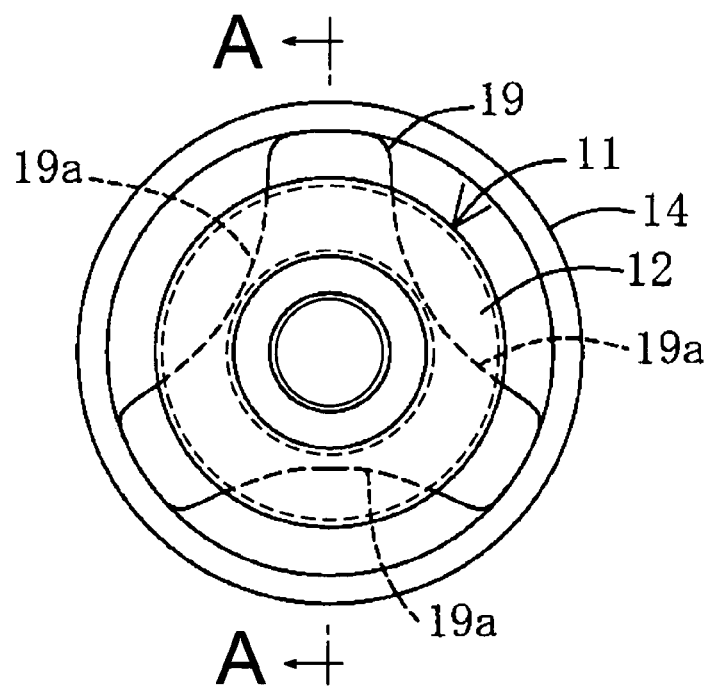
FIG. 4B is a side elevational view of a suspension bushing of construction according to a second embodiment of the present invention.
Figure 5:
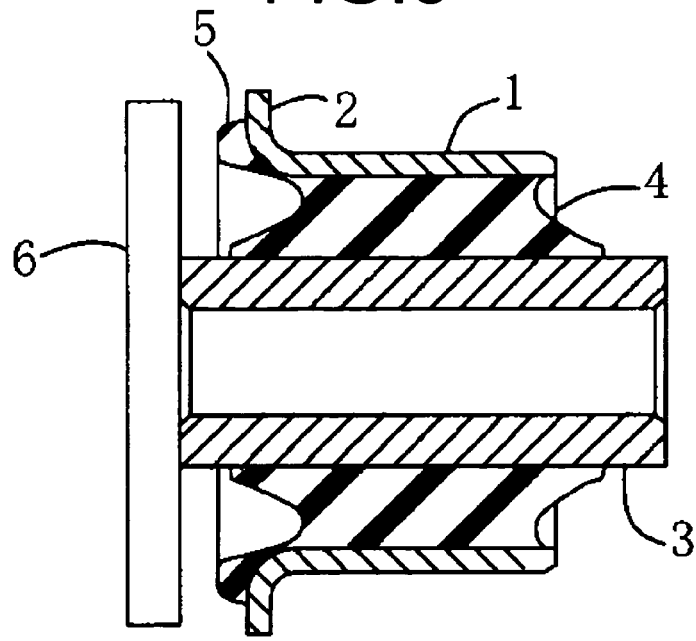
FIG. 5 is an axial cross sectional view of a conventional suspension bushing.
Figure 6:
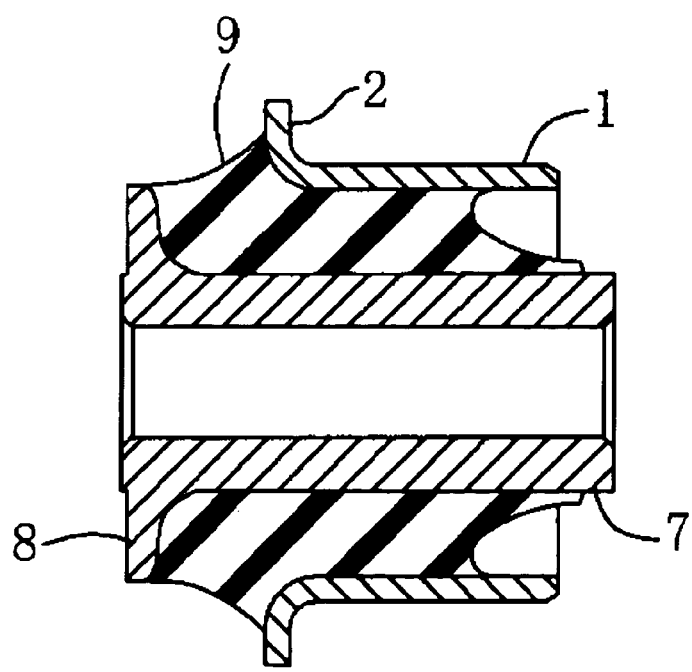
FIG. 6 is an axial cross sectional view of another conventional suspension bushing.

FIG. 4 shows a second embodiment of the present invention wherein the bushing 10 is modified such that hollow portions 19a may be disposed at equidistant intervals at three locations in the circumferential direction of the elastic body end portion 19. Like the end section 17 of the rubber elastic body 16, an end section 19 of the rubber elastic body is ensured to have circumferential width of 5 mm or more at the outer rim thereof. With this arrangement, as well, by disposing hollow portions 19a at equidistant intervals at three locations in the circumferential direction of the elastic body end portion 19, directionality of locations of the hollow portions 18 in the elastic body end section 17 is eliminated. As a result, there are afforded advantages analogous to those of the first embodiment hereinabove, such as stable vehicle drivability consistent with the design settings can be assured irrespective of variability in the procedure of installing the bushing onto a vehicle.

In the illustrated embodiments hereinabove, the hollow portions 18, 19a are disposed at equidistant intervals in the circumferential direction of the elastic body end portion 17, 19. However, while the advantages of symmetry in hollow portion placement will be lost, random placement of the hollow portions would be possible, depending on required spring characteristics. In the embodiments hereinabove, use of the vibration damping device as a suspension bushing 10 has been described, but the present invention may also be implement in a vehicle member mounting, body mounting or the like. The bushings shown in the illustrated embodiments set forth hereinabove are merely exemplary, and could be modified in various ways without departing from the spirit of the invention.

For instance, the bushing 10 may have axial voids formed through the rubber elastic body 16, depending upon required spring characteristics. Further, the bushing 10 may be installed in any conventional manner, e.g., in a manner where a pair of bushings 10 are installed between two components coupled together in a vibration damping fashion.

The vibration damping device of the invention ensures stable vehicle drivability consistent with settings, and provides softer spring characteristics in the axial direction and the torsion direction of the rubber elastic body disposed between the two outer flanges of the inner cylinder member, so as to give the vehicle a comfortable ride, as well as improving the durability of the rubber elastic body, making it very useful.

It is also to be understood that the present invention may be embodied with various other changes, modifications and improvements, which may occur to those skilled in the art, without departing from the spirit and scope of the invention defined in the following claims.

What is claimed is:

1. A vibration damping device comprising:
    an inner cylinder member having a first outer flange that extends diametrically outward at one axial end thereof;
    an outer cylinder member having a second outer flange that extends diametrically outward at one axial end thereof, the outer cylinder member being coaxially disposed about the inner cylinder member with the one axial end of the inner cylinder member projecting out from the one axial end of the outer cylinder member and the first and second outer flanges situated spaced apart in opposition to one another in the axial direction; and
    a rubber elastic body interposed between and elastically connecting the inner cylinder member and the outer cylinder member, while having an end section sandwiched between the first and second outer flanges,
    wherein the rubber elastic body is provided with hollow portions recessed diametrically inward from an outside periphery of the first outer flange at three or four locations in an circumferential direction of the end section of the rubber elastic body;
    wherein the hollow portions are disposed at equidistant intervals in the circumferential direction, and
    wherein each hollow portion has an arcuate concave shape overall in transverse cross section wherein an inwardly curved bottom surface located in a most radially inner position thereof extends toward both circumferential ends thereof while gradually extending radially outwardly.

2. A vibration damping device according to claim 1, wherein the end section of the rubber elastic body measures at an outer rim portion thereof a circumferential width of 5 mm or more.

3. A vibration damping device according to claim 1, wherein each hollow portion has a largest diametrical depth dimension B that is smaller than a half of a diametrical interval A between cylindrical portions of the inner and outer cylinder members (B<A/2).

* * * * *